(12) United States Patent
Ross et al.

(10) Patent No.: US 11,370,535 B2
(45) Date of Patent: **\*Jun. 28, 2022**

(54) TILTROTOR WITH INBOARD ENGINES

(71) Applicant: Bell Helicopter Textron Inc., Fort Worth, TX (US)

(72) Inventors: Brent C. Ross, Flower Mound, TX (US); Steven R. Ivans, Ponder, TX (US)

(73) Assignee: Textron Innovations Inc., Fort Worth, TX (US)

( * ) Notice: Subject to any disclaimer, the term of this patent is extended or adjusted under 35 U.S.C. 154(b) by 891 days.

This patent is subject to a terminal disclaimer.

(21) Appl. No.: 16/196,247

(22) Filed: Nov. 20, 2018

(65) Prior Publication Data
US 2019/0084669 A1    Mar. 21, 2019

Related U.S. Application Data

(63) Continuation of application No. 14/960,486, filed on Dec. 7, 2015, now Pat. No. 10,183,745.

(51) Int. Cl.
*B64C 29/00* (2006.01)
*B64D 35/08* (2006.01)
(Continued)

(52) U.S. Cl.
CPC .......... *B64C 29/0033* (2013.01); *B64C 3/185* (2013.01); *B64C 3/187* (2013.01); *B64D 27/12* (2013.01); *B64D 35/08* (2013.01)

(58) Field of Classification Search
CPC ..... B64C 29/0033; B64C 3/185; B64C 3/187; B64D 35/04; B64D 35/06; B64D 35/08; B64D 27/12
See application file for complete search history.

(56) References Cited

U.S. PATENT DOCUMENTS 2,478,847 A * 8/1949 Stuart ................. B64C 29/0033
                                                        244/7 R
2,814,451 A * 11/1957 Turner ................ B64C 29/0033
                                                        244/7 R
(Continued)

FOREIGN PATENT DOCUMENTS

EP    1057724 A2    12/2000
FR    2791319 A1     9/2000

OTHER PUBLICATIONS

Examination Report in related European patent application No. 12153373.1, dated Aug. 9, 2013, 4 pages.
(Continued)

*Primary Examiner* — Assres H Woldemaryam
*Assistant Examiner* — Aaron M Rodziwicz
(74) *Attorney, Agent, or Firm* — Patent Capital Group

(57) ABSTRACT

An aircraft is described and includes a fuselage, a wing coupled to the fuselage, and a rotor system including a proprotor system and an engine. An interconnect driveshaft gear is configured to communicate mechanical energy between a gearbox and an interconnect driveshaft. An accessory gear is coplanar with and in mechanical communication with the driveshaft gear. A proprotor gear is coplanar with and in mechanical communication with the interconnect driveshaft gear and the accessory gear and communicates mechanical energy to the proprotor system. An engine gear coplanar and in mechanical communication with the interconnect driveshaft ear, the accessory gear, and the proprotor gear transmits mechanical energy to the proprotor system via the proprotor gear.

20 Claims, 10 Drawing Sheets

(51) Int. Cl.
  *B64C 3/18* (2006.01)
  *B64D 27/12* (2006.01)

(56) References Cited

U.S. PATENT DOCUMENTS

| | | | |
|---|---|---|---|
| 2,974,900 A | | 3/1961 | Morris et al. |
| 3,284,027 A | | 11/1966 | Mesniere |
| 3,586,262 A | | 6/1971 | Sherman |
| 3,592,412 A | | 7/1971 | Glatfelter |
| 4,979,698 A | * | 12/1990 | Lederman ............ B64C 29/0033 244/17.13 |
| 5,054,716 A | * | 10/1991 | Wilson ................ B64C 29/0033 244/56 |
| 5,823,470 A | * | 10/1998 | Craig .................... B64D 35/00 244/7 R |
| 6,260,793 B1 | * | 7/2001 | Balayn ................. B64C 39/029 244/7 R |
| 6,276,633 B1 | * | 8/2001 | Balayn ................... B64C 27/12 244/56 |
| 6,607,161 B1 | * | 8/2003 | Krysinski ................ B64C 9/00 244/7 A |
| 8,292,216 B1 | * | 10/2012 | Rumberger, Jr. ......... B64F 5/50 244/39 |
| 8,602,347 B2 | * | 12/2013 | Isaac ...................... B64D 35/04 244/7 A |
| 9,174,731 B2 | | 11/2015 | Ross et al. |
| 9,199,732 B2 | * | 12/2015 | Isaac .................... B64D 35/00 |
| 10,252,797 B2 | * | 4/2019 | Vondrell ................. B64C 11/46 |
| 10,384,773 B2 | * | 8/2019 | Vondrell ................. B64D 27/24 |
| 10,384,774 B2 | * | 8/2019 | Vondrell .................... H02P 9/04 |
| 10,392,106 B2 | * | 8/2019 | Vondrell ................ B64D 27/12 |
| 2006/0016930 A1 | | 1/2006 | Pak |
| 2009/0224096 A1 | * | 9/2009 | Waide .................... B64D 31/12 244/60 |
| 2010/0276549 A1 | * | 11/2010 | Karem ................ B64C 29/0033 244/7 A |
| 2012/0199699 A1 | * | 8/2012 | Isaac ................... B64C 29/0033 244/7 R |
| 2014/0263854 A1 | * | 9/2014 | Ross ................... B64C 29/0033 244/7 A |
| 2014/0263855 A1 | * | 9/2014 | Ross ................... B64C 29/0033 244/7 A |
| 2017/0158323 A1 | | 6/2017 | Ross et al. |

OTHER PUBLICATIONS

Extended European Search Report from related European Application No. 121533373.1, dated Jun. 15, 2012, 8 pages.
Final Rejection in U.S. Appl. No. 14/960,486 dated May 29, 2018, 39 pages.
Non-Final Office Action in U.S. Appl. No. 14/960,486 dated Oct. 19, 2017, 25 pages.
Notice of Allowance in U.S. Appl. No. 14/960,486 dated Sep. 19, 2018, 14 pages.

* cited by examiner

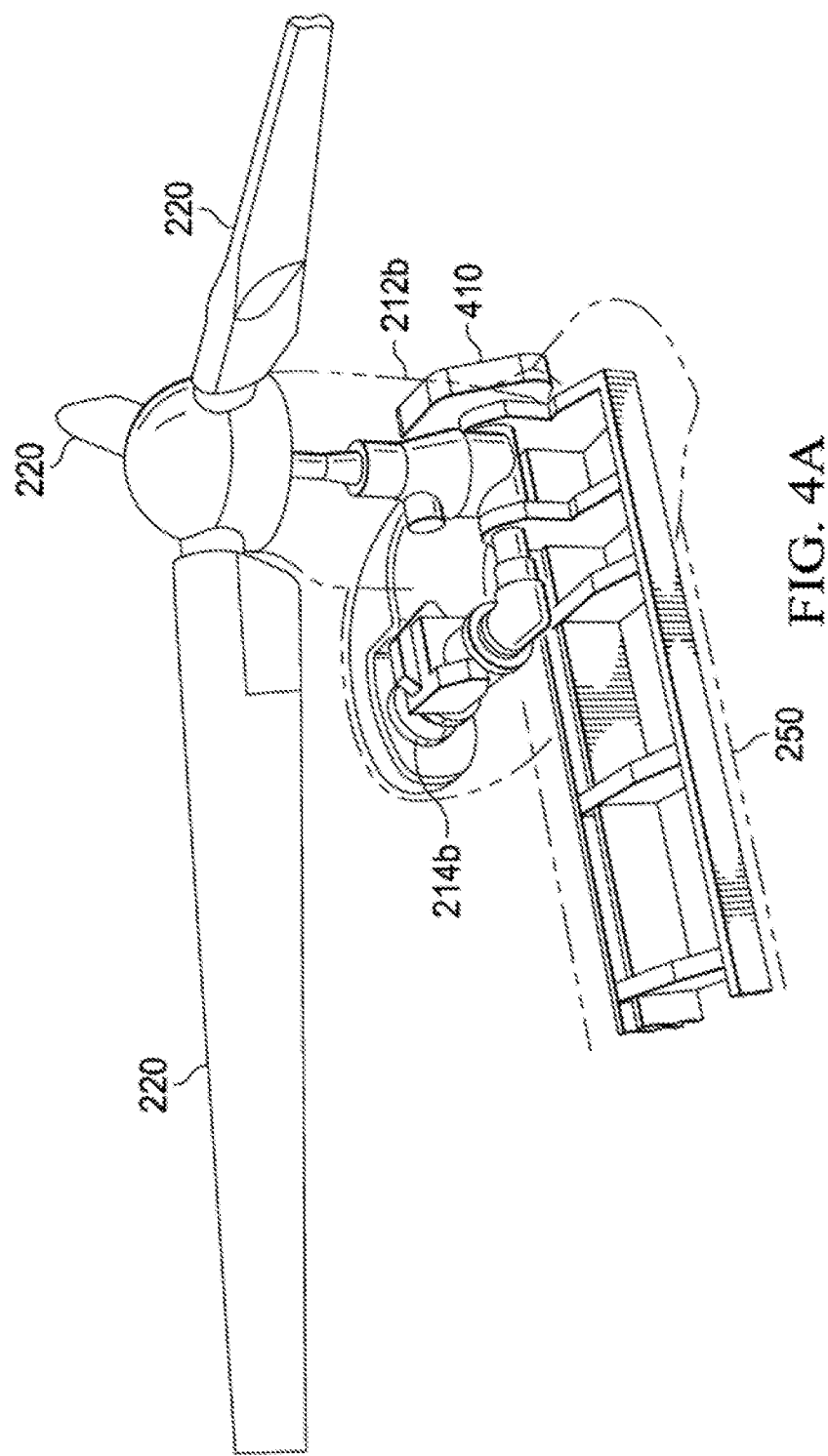

TILTROTOR WITH INBOARD ENGINES

PRIORITY CLAIM

This application is a continuation and claims the benefit of priority under 35 U.S.C. § 120 of U.S. application Ser. No. 14/960,486, filed on Dec. 7, 2015, entitled "TILTROTOR WITH INBOARD ENGINES," Inventors Brent C. Ross et al. The disclosure of the prior application is considered part of and is incorporated in its entirety by reference in the disclosure of this application.

TECHNICAL FIELD

This invention relates generally to tiltrotor aircraft, and more particularly, to a tiltrotor with inboard engines.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. A tiltrotor aircraft may include two rotor systems that can tilt upward to provide upward thrust or forward to provide forward thrust.

SUMMARY

Particular embodiments of the present disclosure may provide one or more technical advantages. A technical advantage of one embodiment may include the capability to move rotor systems 110a and 110b towards the tips of wing 150 so as to maximize the lengths of both wing 150 and rotor blades 120.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 4A-4C shows a gearbox configuration installed on the tiltrotor aircraft of FIG. 2A according to an alternative example embodiment.

DETAILED DESCRIPTION OF THE DRAWINGS

Figure 1:
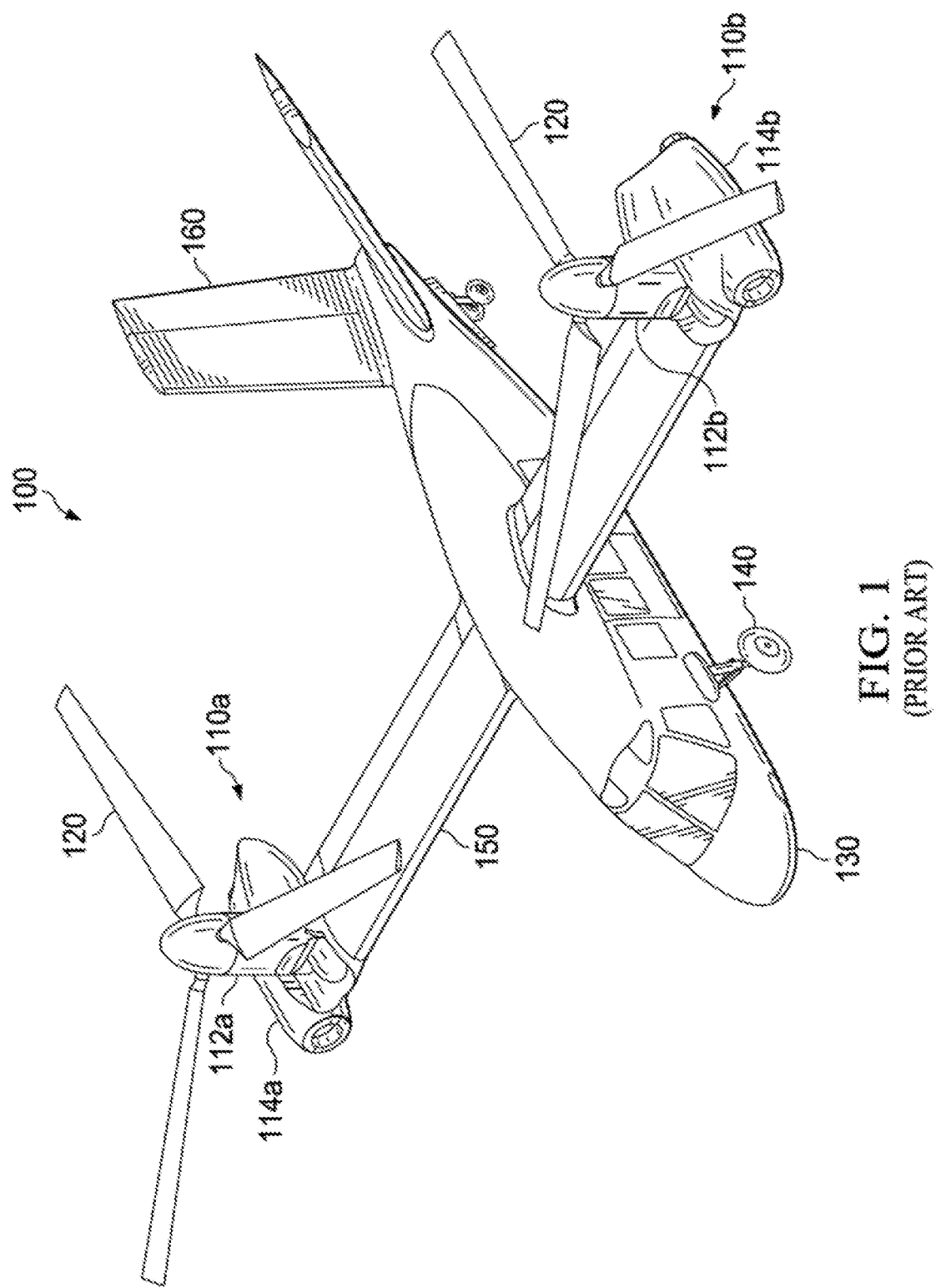
FIG. 1 shows a tiltrotor aircraft with inboard pylons in accordance with teachings of the Prior Art.

FIG. 1 shows a rotorcraft 100. Rotorcraft 100 features rotor systems 110a and 110b, blades 120, a fuselage 130, a landing gear 140, a wing 150, and an empennage 160.

Rotor system 110 may rotate blades 120. Rotor system 110 may include a control system for selectively controlling the pitch of each blade 120 in order to selectively control direction, thrust, and lift of rotorcraft 100.

In the example of FIG. 1, rotorcraft 100 represents a tiltrotor aircraft, and rotor systems 110a and 110b feature rotatable pylons 112a and 112b. In this example, the position of pylons 112a and 112b, as well as the pitch of rotor blades 120, can be selectively controlled in order to selectively control direction, thrust, and lift of tiltrotor aircraft 100. Power to rotor systems 110a and 110b is provided by engines 114a and 114b.

Fuselage 130 represents the main body of rotorcraft 100 and may be coupled to rotor system 110 (e.g., via wing 150) such that rotor system 110 and blades 120 may move fuselage 130 through the air. Landing gear 140 supports rotorcraft 100 when rotorcraft 100 is landing and/or when rotorcraft 100 is at rest on the ground.

In the example of FIG. 1, tiltrotor aircraft 100 may operate in a helicopter mode by tilting the pylons upright and in an airplane mode by tilting the pylons forward. Tiltrotor aircraft 100 may generate greater forward speed in airplane mode than in helicopter mode because, in airplane mode, blades 120 are oriented to generate greater thrust propelling the aircraft forward (somewhat analogous to a propeller).

Rotorcraft 100 also features at least one empennage 160. Empennage 160 represents a flight control surface coupled to the tail portion of fuselage 130. In the example of FIG. 1, rotorcraft 100 features two empennage sections 160. In this example, the combination of the two empennage sections 160 may represent a v-tail configuration.

Although appropriate for a variety of missions and settings, rotorcraft 100 may present certain issues when it comes time for storage. For example, the length of wing 150 may be limited by the ability to fit into a small space, such as required when storing on a ship. However, reducing the length of wing 150 to accommodate these storage requirements may limit the length of rotor blades 120 because the tips of rotor blades 120 must remain a safe distance way from fuselage 130 during operation of rotorcraft 100.

Accordingly, teachings of certain embodiments recognize the capability to move rotor systems 110a and 110b towards the tips of wing 150 so as to maximize the lengths of both wing 150 and rotor blades 120. Teachings of certain embodiments recognize, however, that this may result in shorter flaperons, which may affect control of the rotorcraft.

Figure 2A:
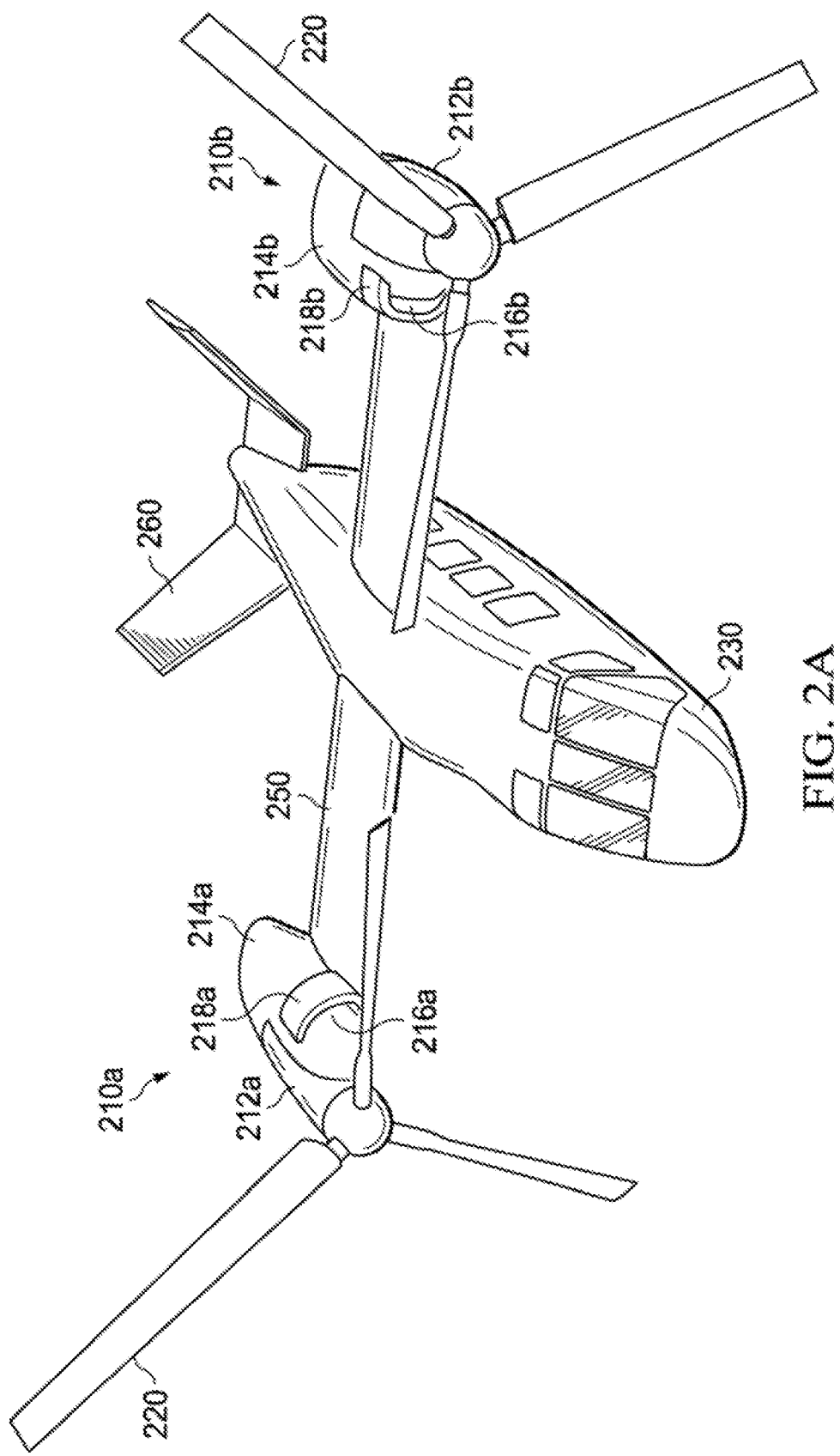
FIG. 2A shows a tiltrotor aircraft with outboard pylons in airplane mode according to one example embodiment.
Figure 2B:
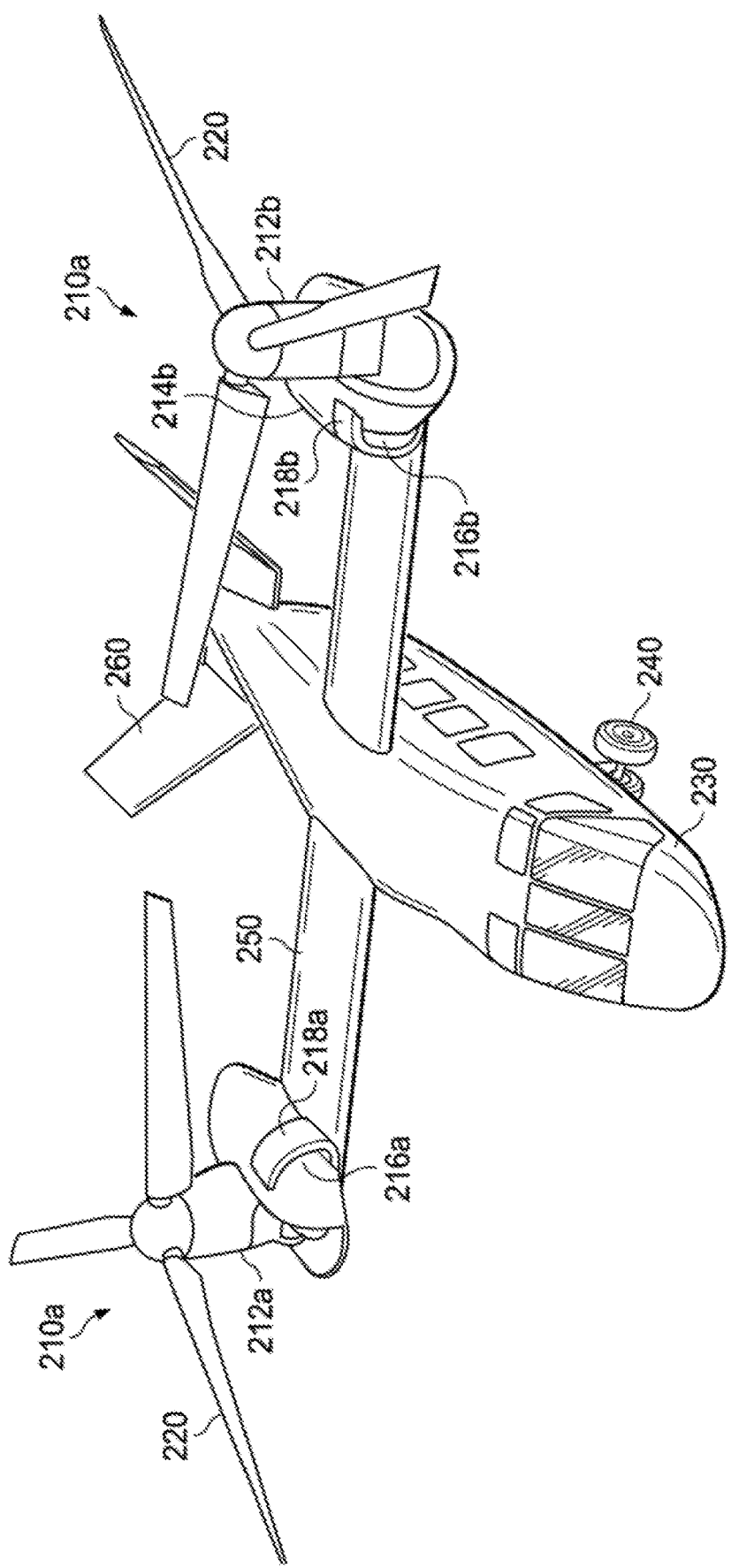
FIG. 2B shows the tiltrotor aircraft of FIG. 2A in helicopter mode.
Figure 2C:
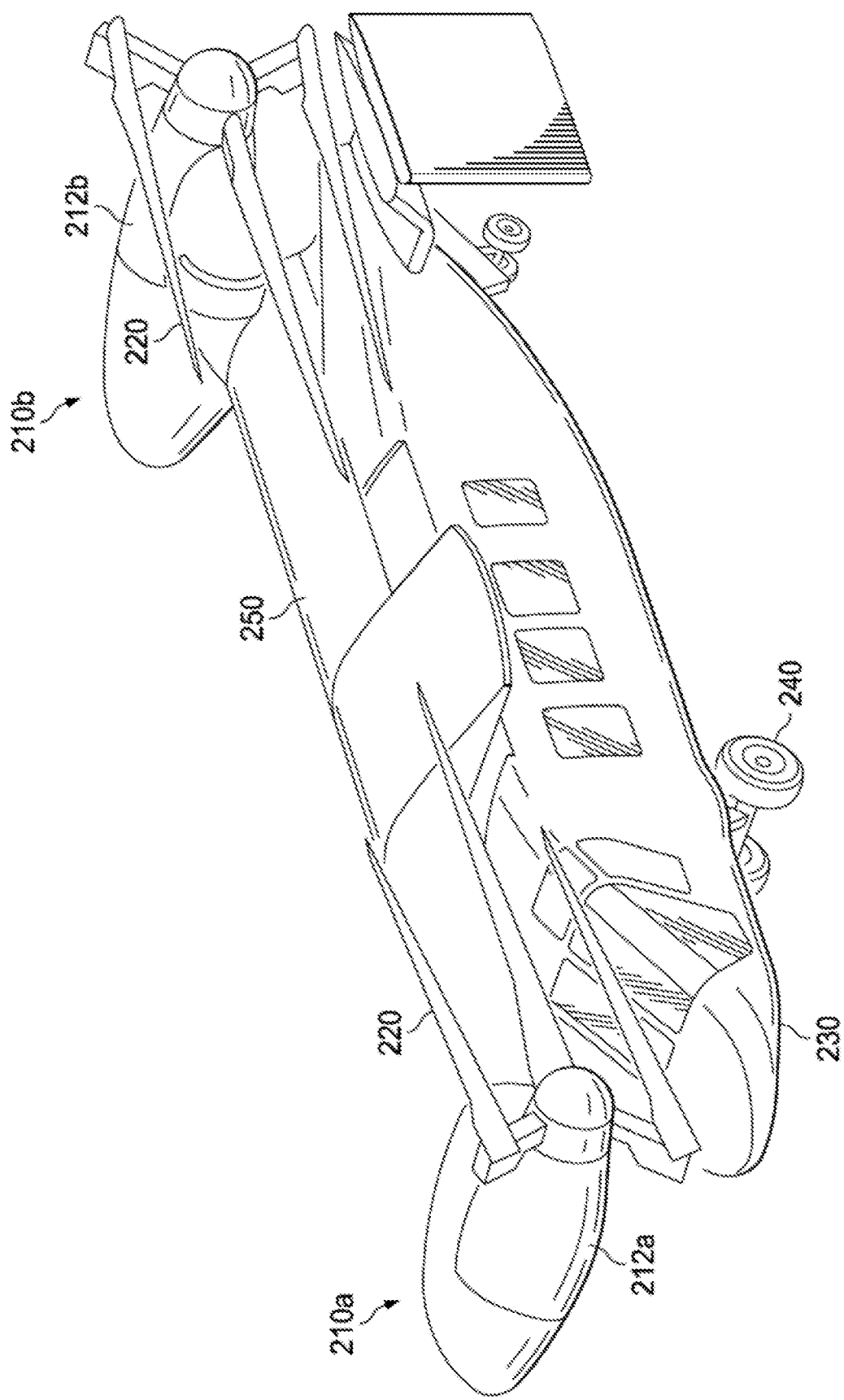
FIG. 2C shows the tiltrotor aircraft of FIG. 2A with its wing and rotor blades folded away for storage.

FIGS. 2A-2C show a rotorcraft 200 according to one example embodiments with its rotor systems located towards the tips of the wing. FIG. 2A shows rotorcraft 200 in airplane mode, FIG. 2B shows rotorcraft 200 in helicopter mode, and FIG. 2C shows rotorcraft 200 with its wing and rotor blades folded away for storage.

In the example of FIGS. 2A-2C, rotorcraft 200 features rotor systems 210a and 210b, blades 220, a fuselage 230, a landing gear 240, a wing 250, and an empennage 260. Some or all of these components may share similarities with components of rotorcraft 100 of FIG. 1, such as rotor systems 110a and 110b, blades 120, a fuselage 130, a landing gear 140, a wing 150, and an empennage 160.

Unlike rotorcraft 100, the engines 214a and 214b are located above wing 250, outboard of fuselage 230, and inboard of respective pylons 212a and 212b. Each engine 214a and 214b also features respective inlets 216a and 216b as well as associated inlet barrier filters 218a and 218b. Each engine 214a and 214b is in mechanical communication with an associated pylon 212a and 212b such that engines 214a and 214b provides mechanical energy that causes blades 220 to rotate. Like in rotorcraft 100, engines 214a and 214b are fixed relative to wing 250.

Figure 3A:
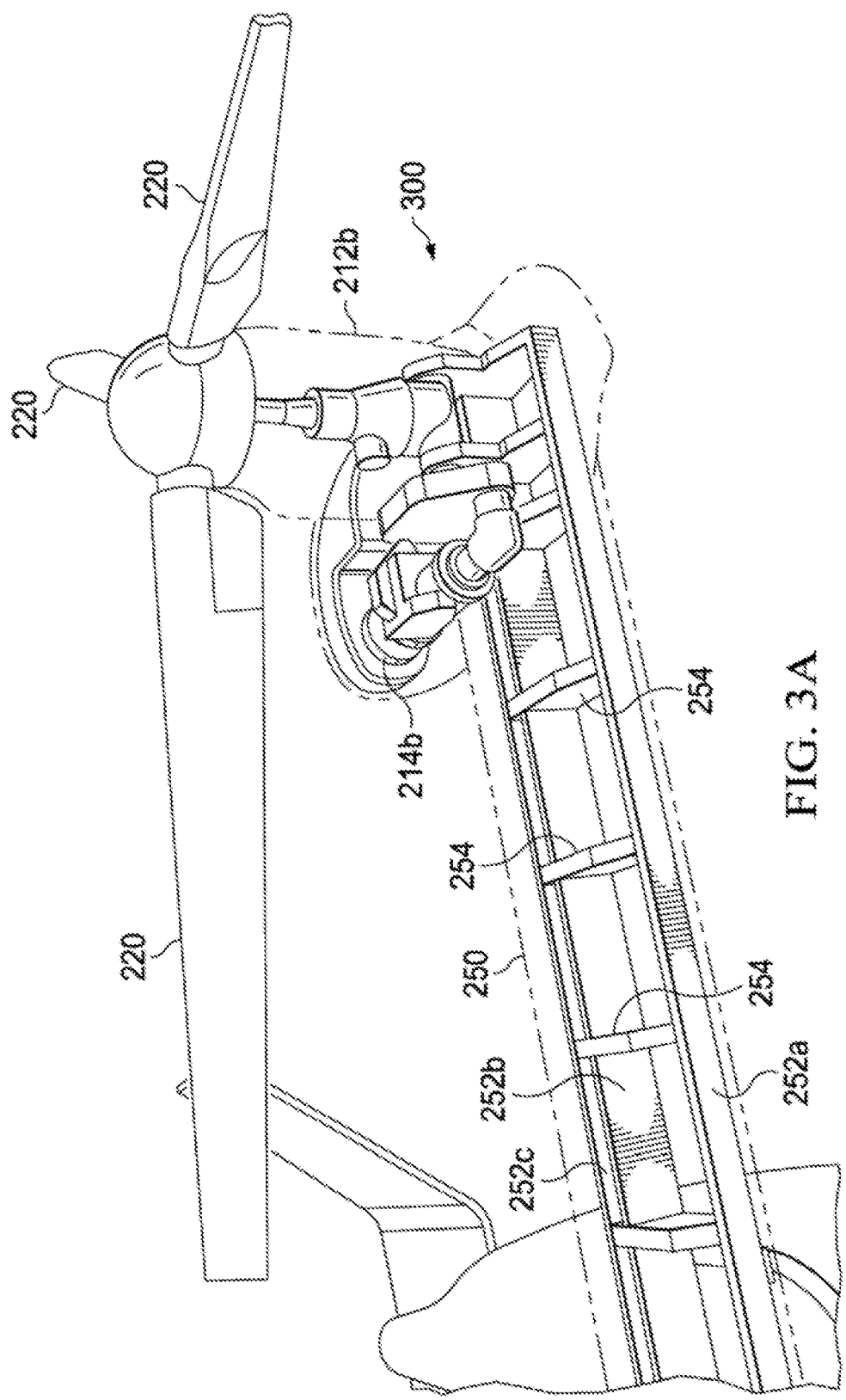
FIGS. 3A-3C shows a gearbox configuration installed on the tiltrotor aircraft of FIG. 2A according to one example embodiment.
Figure 3B:
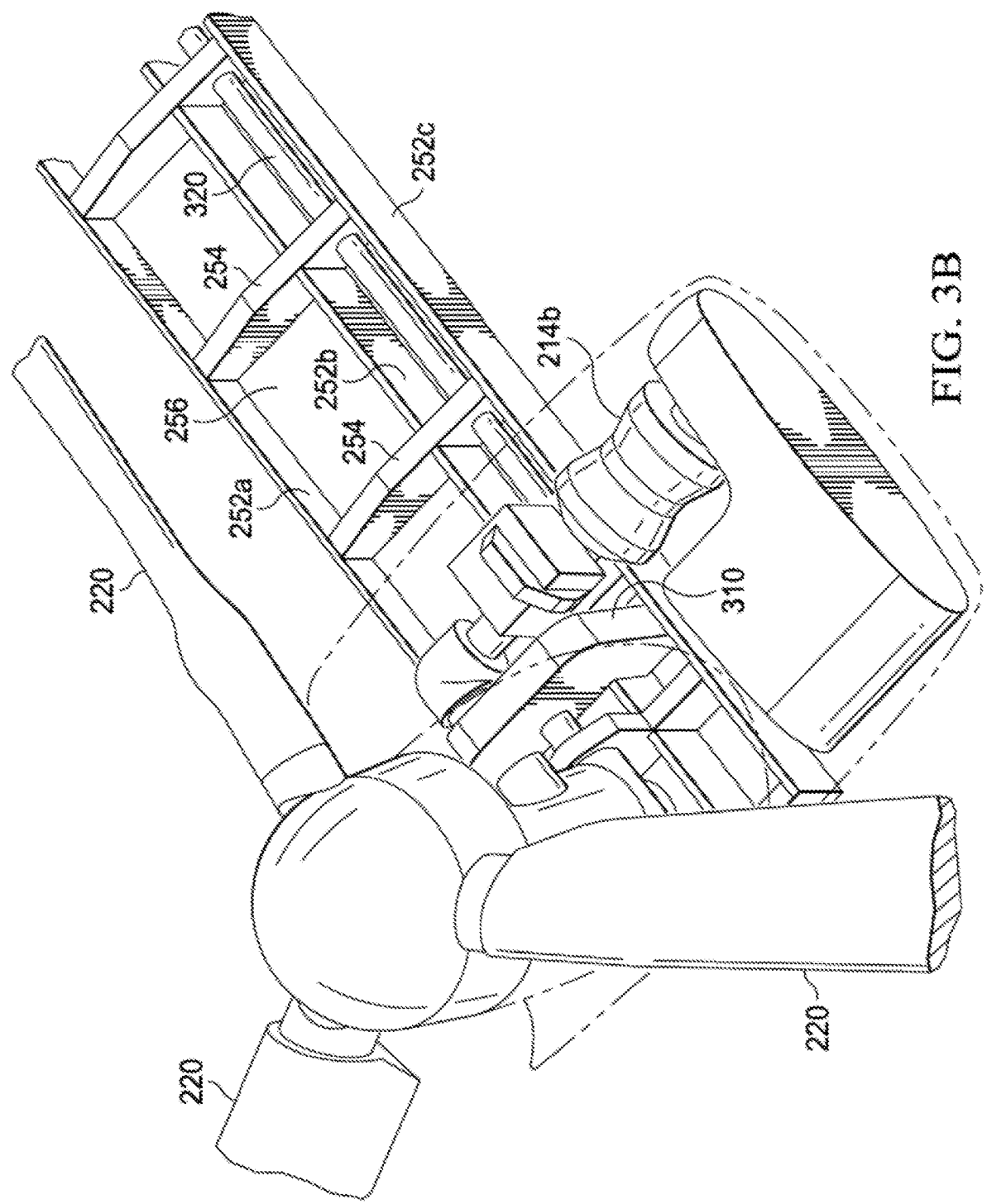
Figure 3C:
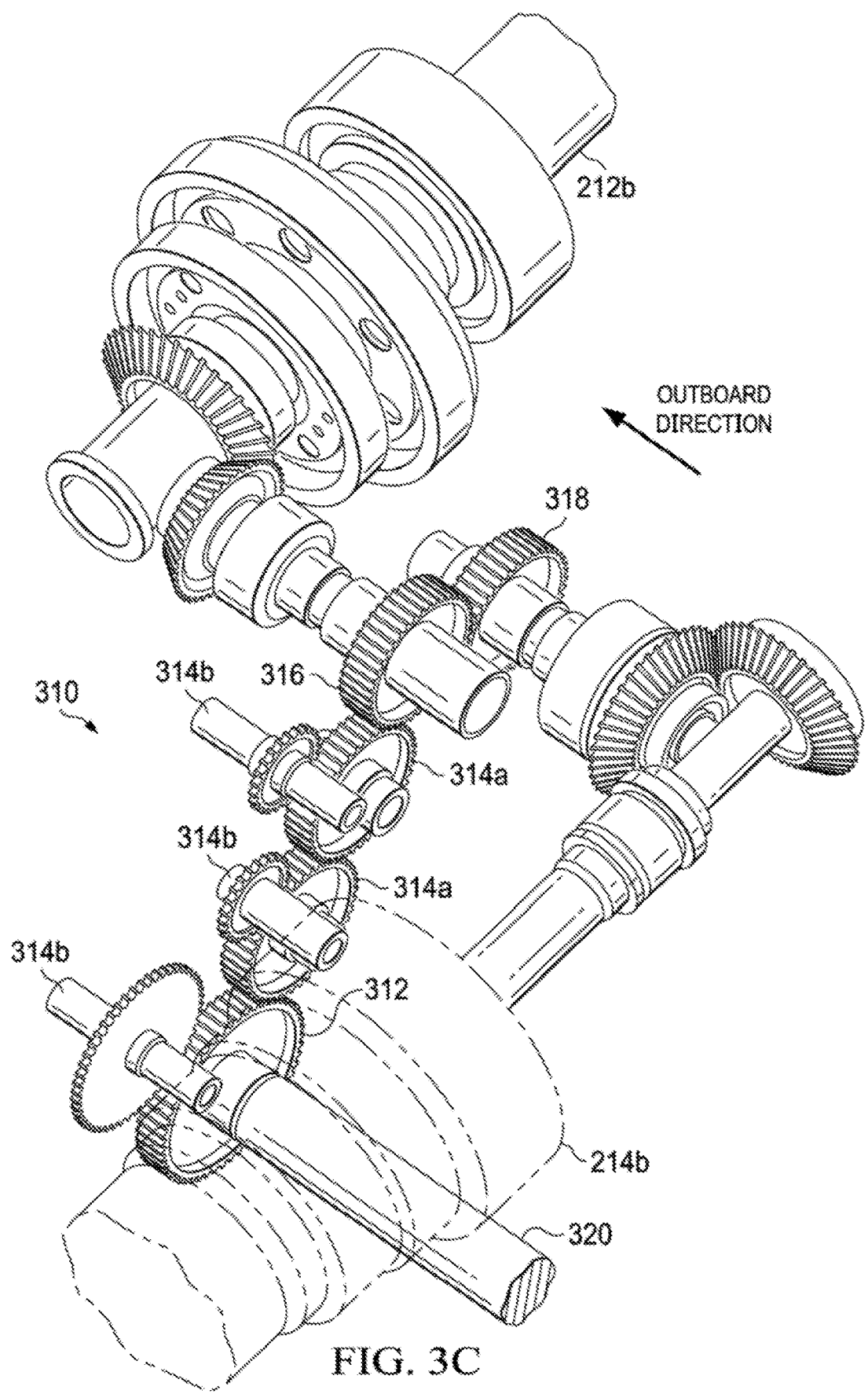

FIGS. 3A-3C shows a gearbox configuration 300 installed on rotorcraft 200 according to one example embodiment. FIGS. 3A and 3B show perspective views of gearbox configuration 300, and FIG. 3C shows an exploded view of the gearbox assembly of gearbox configuration 300.

In the example of FIGS. 3A-3C, gearbox configuration 300 features a gearbox 310 and an interconnect drive shaft 320. The example gearbox configuration 300 is shown in FIGS. 3A-3C installed with respect to pylon 212b and engine 214b, but teachings of certain embodiments recognize that gearbox configuration 300 could also be installed with respect to pylon 212a and engine 214a.

As seen in the examples of FIGS. 3A-3B, gearbox 310 is located inboard of pylon 212b and is fixed relative to wing 250 such that gearbox 310 does not rotate with pylon 212b. In the example of FIG. 3C, gearbox 310 features an interconnect driveshaft gear 312, interconnect gears 314a, accessory gears 314b, a proprotor gear 316, and an engine gear 318. Interconnect driveshaft gear 312 is configured to communicate mechanical energy with interconnect driveshaft 320, accessory gears 314 are configured to communicate mechanical energy with accessory devices (such as generators are pumps), interconnect gears 314a are configured to communicate mechanical energy between interconnect driveshaft gear 312 and proprotor gear 316, proprotor gear 316b is configured to communicate mechanical energy with pylon 212b, and engine gear 318 is configured to receive mechanical energy from engine 214b. In this example, each of these gears are coplanar, although teachings of certain embodiments recognize that other configurations may be used.

Interconnect drive shaft 320 provides mechanical communication between engines 214a and 214b such that, if one engine fails, the other engine can power both pylons 212a and 212b. Interconnect drive shaft 320 is installed at least partially within wing 250. More specifically, as seen in the examples of FIGS. 3A and 3B, interconnect drive shaft 320 is located between two rear spars 252b and 252c of wing 250 and passes through openings in wing ribs 254 spread out across wing 250. As seen in the example of FIG. 3B, spars 252a and 252b and ribs 254 intersect to define wing torque boxes 256. In some embodiments, gearbox 310 is positioned adjacent to and about a spar 252b such that gearbox 310 does not intrude into a torque box 256. Examples of such intrusions may include residing within the interior portion of a torque box 256 or protruding through a spar 252b or rib 254 such that the structural strength of a torque box 256 is reduced.

In operation, according to one example embodiment, power is transmitted from the engine through a spiral bevel into the clutch and into a helical gear train that connects the interconnect drive shaft and conversion axis spindle gearbox, which are offset vertically and fore and aft. Accessories for hydraulic and power systems are also mounted and run on the helical train. The interconnect gearbox may allow an offset between the spiral bevel from the engine such that a removable floating quill shaft can join the fixed and rotating drive systems. Teachings of certain embodiments recognize that such an arrangement may allow for servicing of the critical shaft that bridges rotating to fixed drive systems. The spindle gearbox, which rotates, is supported by extensions containing bearings above the wing of the two outboard tip ribs and connects to the floating quill shaft. A spiral bevel at the center of the spindle gear box provides power to a dual planetary reduction to final mast speeds.

The wing torque box with intermediate ribs support the engine, fixed drive system, and rotating pylon interfaces. The interconnect gearbox is mounted to the top of wing torque box with a bellhousing connecting the transmission and the inboard tip rib at the conversion axis providing a rigid attachment. The tip ribs extend above the wing and the upper portion of the rib is removable with a pillow block arrangement with tension or shear attachments possible for pylon removal.

Figure 4B:
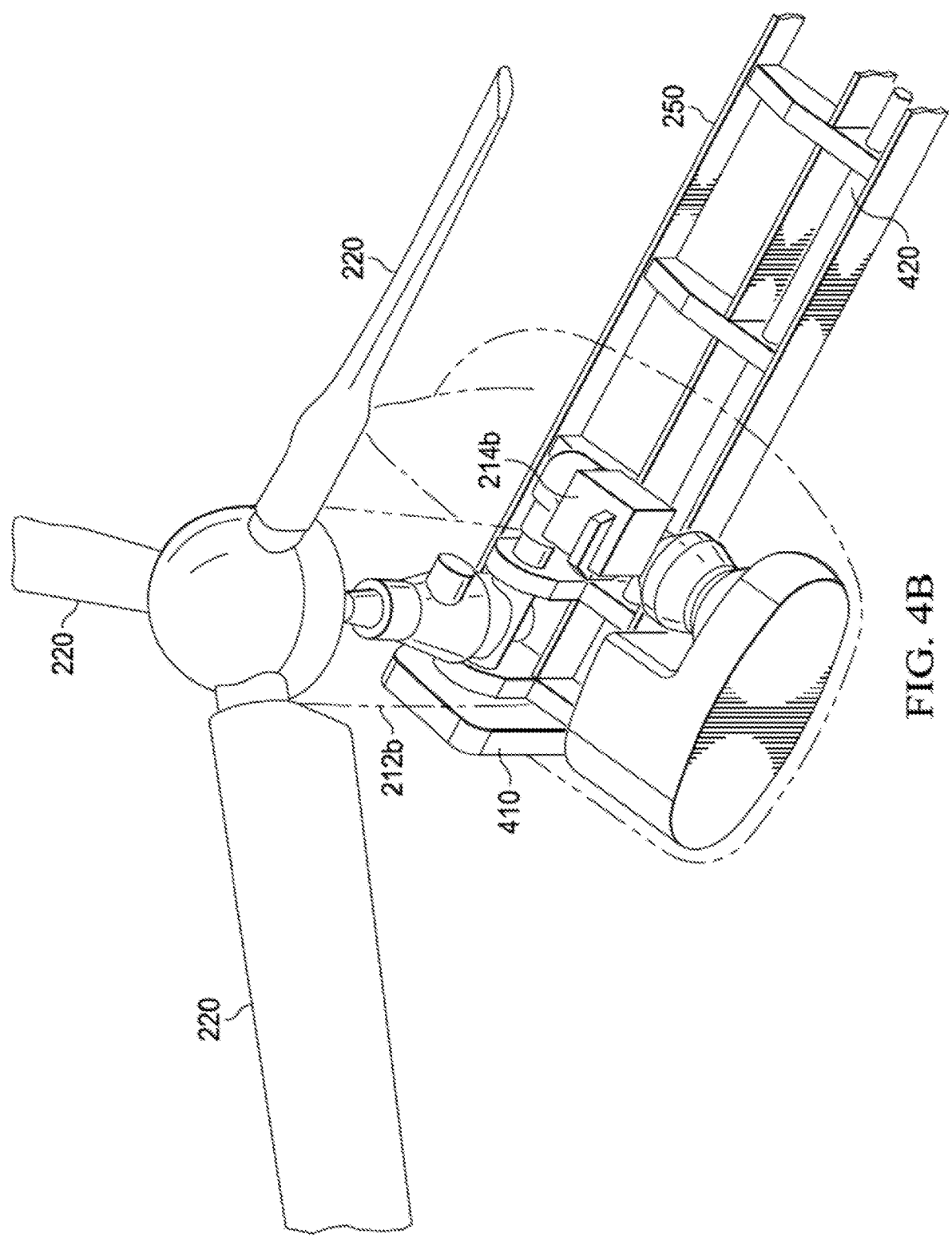
Figure 4C:
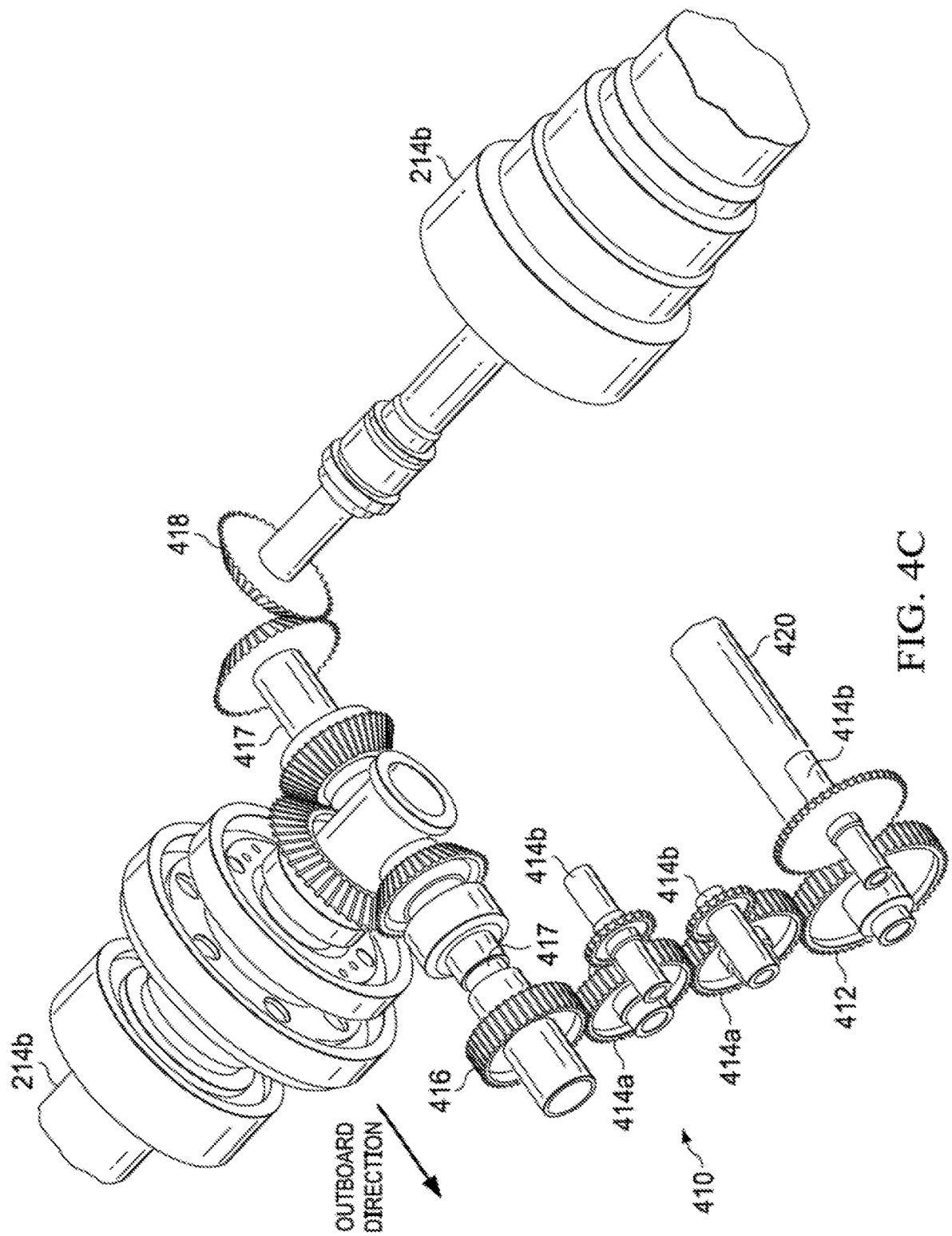

FIGS. 4A-4C shows a gearbox configuration 400 installed on rotorcraft 200 according to an alternative example embodiment. FIGS. 4A and 4B show perspective views of gearbox configuration 400, and FIG. 4C shows an exploded view of the gearbox assembly of gearbox configuration 400.

In the example of FIGS. 4A-4C, gearbox configuration 400 features a gearbox 410 and an interconnect drive shaft 420. The example gearbox configuration 300 is shown in FIGS. 4A-4C installed with respect to pylon 212b and engine 214b, but teachings of certain embodiments recognize that gearbox configuration 400 could also be installed with respect to pylon 212a and engine 214a.

As seen in the examples of FIGS. 4A-4B, gearbox 410 is located outboard of pylon 212b and is fixed relative to wing 250 such that gearbox 410 does not rotate with pylon 212b. In the example of FIG. 4C, gearbox 410 features an interconnect driveshaft gear 412, interconnect gears 414a, accessory gears 414b, a proprotor gear 416, proprotor shafts 417, and an engine gear 418. Interconnect driveshaft gear 412 is configured to communicate mechanical energy with interconnect driveshaft 420, interconnect gears 414a are configured to communicate mechanical energy between interconnect driveshaft gear 412 and proprotor gear 416, accessory gears 414b are configured to communicate mechanical energy with accessory devices (such as generators or pumps), proprotor gear 416 is configured to communicate mechanical energy with pylon 212b, and engine gear 418 is configured to receive mechanical energy from engine 214b. Proprotor shafts 417 are coupled to proprotor gear 416 and pass through a portion of pylon 212b and couple to engine gear 418. In this example, interconnect driveshaft gear 412, accessory gears 414, and proprotor gear 416 are coplanar, although teachings of certain embodiments recognize that other configurations may be used. Gearbox configurations 300 and 400 may provide a number of relative advantages. For example, gearbox configuration 300 may provide improved accessibility for workers responsible for maintaining or repairing components associated with pylons 212a and 212b. Gearbox configuration 400, on the other hand, may provide additional space for accessories, such as generators or hydraulic pumps by moving gearbox 410 to an outboard location and away from the space constraints imposed by wing 250.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. An aircraft, comprising:
   a wing;
   a first rotor system coupled to the wing, the first rotor system comprising:
      a first proprotor system comprising a first pylon disposed proximate to a first wing tip of the wing, the first pylon being tiltable between a helicopter mode position and an airplane mode position;
      a first engine in mechanical communication with the first proprotor system and coupled proximate to the first wing tip;
   an interconnect drive shaft in mechanical communication with the first engine;
   a first gearbox in mechanical communication with the first engine, the first proprotor system, and the interconnect drive shaft;
   an interconnect driveshaft gear configured to communicate mechanical energy between the first gearbox and the interconnect driveshaft;
   one or more accessory gears coplanar with and in mechanical communication with the interconnect driveshaft gear; and
   a proprotor gear coplanar with and in mechanical communication with the interconnect driveshaft gear and the one or more accessory gears, the proprotor gear configured to communicate mechanical energy to the first proprotor system.

2. The aircraft of claim 1 further comprising:
   a second rotor system coupled to the wing, the second rotor system comprising:
      a second proprotor system comprising a second pylon disposed proximate to a second wing tip of the wing opposite the first wing tip, the second pylon being tiltable between a helicopter mode position and an airplane mode position; and
      a second engine in mechanical communication with the second proprotor system and coupled proximate to the second wing tip; and
   a second gearbox in mechanical communication with the second engine, the second proprotor system, and the interconnect drive shaft;
   wherein the interconnect drive shaft is further in mechanical communication with the second engine.

3. The aircraft of claim 2, wherein the first engine is disposed outboard of the fuselage, and inboard of the first pylon and the second engine is disposed outboard of the fuselage and inboard of the second pylon.

4. The aircraft of claim 2, wherein:
   the first gearbox is in mechanical communication between the first engine and the first proprotor system; and
   the second gearbox is in mechanical communication between the second engine and the second proprotor system.

5. The aircraft of claim 2, wherein the first gearbox is located inboard of the first proprotor system proximate to the first wing tip and the second gearbox is located inboard of the second proprotor system proximate to the second wing tip.

6. The aircraft of claim 2, wherein:
   the first proprotor system is in mechanical communication between the first engine and the first gearbox; and
   the second proprotor system is in mechanical communication between the second engine and the second gearbox.

7. The aircraft of claim 1 further comprising:
   an engine gear coplanar with and in mechanical communication with the interconnect driveshaft gear, the one or more accessory gears, and the proprotor gear, the engine gear configured to transmit mechanical energy from the first engine to the first proprotor system via the proprotor gear.

8. The aircraft of claim 1, wherein the first engine is disposed above the wing.

9. The aircraft of claim 1, wherein the proprotor gear is located inboard of the first proprotor system.

10. The aircraft of claim 1, wherein the first engine is fixed relative to the wing.

11. The aircraft of claim 1, wherein the first gearbox is fixed relative to the wing.

12. The aircraft of claim 1, the wing comprising:
    a first wing spar;
    a second wing spar;
    a first wing rib coupled and substantially perpendicular to the first and second wing spars; and
    a second wing rib coupled and substantially perpendicular to the first and second wing spars, wherein:
    the first wing spar, the second wing spar, the first wing rib, and the second wing rib form, in combination, a torque box; and
    the first gearbox is positioned adjacent to and about the first wing spar such that the first gearbox does not intrude into the torque box.

13. The aircraft of claim 1, wherein the first gearbox is located outboard of the first proprotor system.

14. The aircraft of claim 1, wherein the first gearbox receives mechanical energy from the first engine via the first proprotor system.

15. An aircraft, comprising:
    a wing;
    a first rotor system coupled to the wing, the first rotor system comprising:
       a first proprotor system comprising a first pylon disposed proximate to a first wing tip of the wing, the first pylon being tiltable between a helicopter mode position and an airplane mode position;
       a first engine in mechanical communication with the first proprotor system and coupled proximate to the first wing tip;
    a second rotor system coupled to the wing, the second rotor system comprising:
       a second proprotor system comprising a second pylon disposed proximate to a second wing tip of the wing opposite the first wing tip, the second pylon being tiltable between a helicopter mode position and an airplane mode position; and
       a second engine in mechanical communication with the second proprotor system and coupled proximate to the second wing tip;
    an interconnect drive shaft in mechanical communication with the first and second engines;
    a first gearbox in mechanical communication with the first engine, the first proprotor system, and the interconnect drive shaft; and a second gearbox in mechanical communication with the second engine, the second proprotor system, and the interconnect drive shaft;

an interconnect driveshaft gear configured to communicate mechanical energy between the first gearbox and the interconnect driveshaft;

one or more accessory gears coplanar with and in mechanical communication with the interconnect driveshaft gear; and an engine gear coplanar with and in mechanical communication with the interconnect driveshaft gear, and the one or more accessory gears, the engine gear configured to transmit mechanical energy from the first engine to the first proprotor system via a proprotor gear.

16. The aircraft of claim 15, wherein the proprotor gear is coplanar with and in mechanical communication with the interconnect driveshaft gear and the one or more accessory gears, the proprotor gear configured to communicate mechanical energy to the first proprotor system.

17. The aircraft of claim 15, wherein the first and second engines are disposed above the wing.

18. The aircraft of claim 15, wherein the first engine is disposed outboard of the fuselage, and inboard of the first pylon and the second engine is disposed outboard of the fuselage and inboard of the second pylon.

19. The aircraft of claim 15, wherein the proprotor gear is located inboard of the first proprotor system.

20. The aircraft of claim 15, wherein the first and second engines and the first and second gear boxes are fixed relative to the wing.

* * * * *